UNITED STATES PATENT OFFICE.

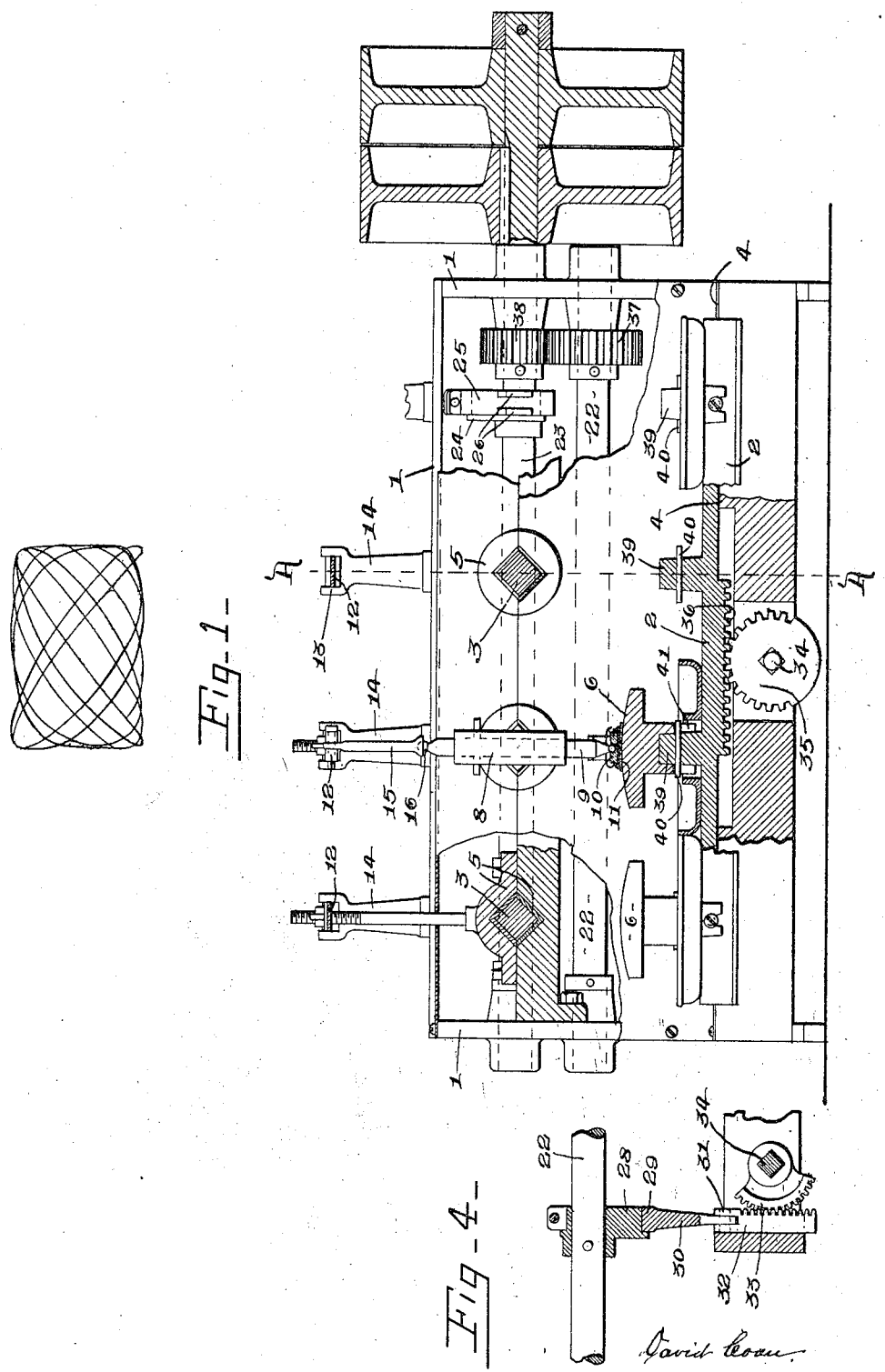

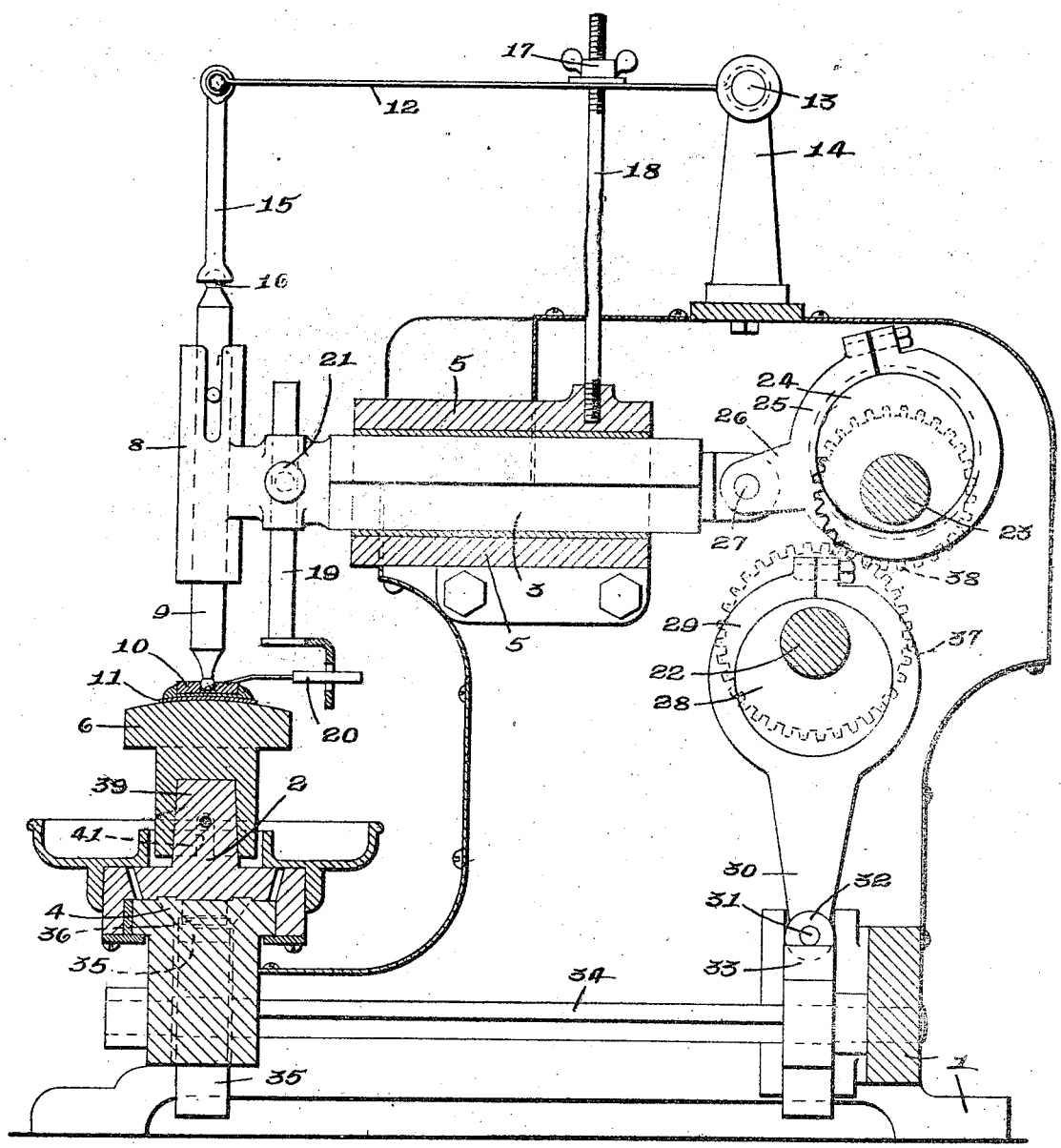

DAVID COAN, OF SYRACUSE, NEW YORK.

LENS-GRINDING MACHINE.

1,250,563.  Specification of Letters Patent. Patented Dec. 18, 1917.

Application filed December 29, 1914. Serial No. 879,460.

*To all whom it may concern:*

Be it known that I, DAVID COAN, a citizen of the United States, and a resident of Syracuse, in the county of Onondaga and State of New York, have invented a certain new and useful Lens-Grinding Machine, of which the following is a specification.

This invention has for its object the production of a machine, for grinding toric and cylinder lenses in which machine the motions of the grinder and lens carriages are such that the line followed by any given point on the grinder is a constantly changing curved path composed by a number of loops none of which coincide during a cycle of movement of the carriage and in which any given point on the grinder will traverse the entire surface of the lens; and the invention consists in the combinations and constructions hereinafter set forth and claimed.

In describing this invention, reference is had to the accompanying drawings, in which like characters designate corresponding parts in all the views.

Figure 1 is a side elevation, partly in section, of my machine.

Fig. 2 is an enlarged sectional view on line A—A, Fig. 1.

Fig. 3 is an indicator card or chart illustrating the resultant of the movements of the two carriages.

Fig. 4 is a fragmentary detail view illustrating a portion of the power transmitting connections between the mechanisms of this machine.

This lens grinding machine comprises, generally, a carriage for supporting the lens, grinder, a carriage for supporting the lens, the carriages being movable in directions at an angle to each other usually in parallel planes, and means for actuating the carriages simultaneously at different rates of speed whereby a relative irregular elliptical or loop motion between the lens and grinder is effected.

1 is the frame of the machine, 2 and 3 are respectively, carriages which are here shown as reciprocating carriages arranged at a right angle to each other, the carriage 2 being movable along a guide 4 on the machine and the carriages 3 being movable at a right angle to the carriage 2 in a guide 5, the carriage 3 being located above the carriage 2. In the machine here illustrated there is one carriage 2 carrying a plurality of grinders 6 and a plurality of carriages 3 for supporting the lenses being operated upon by the grinders 6. Each carriage 3 consists of a square bar slidable in one of the guides 5. The carriages carry at their outer ends vertical tubular guides 8 in which are slidably mounted lens holder stems 9, each stem 9 carrying a device 10 at its lower end to which the lens 11 is secured in any suitable manner. Each stem 9 moves rectilinearly in its holder 8 and is pressed downwardly by means of a spring 12 secured at one end at 13 to a standard 14 rising from the frame 1, and at its other end to a socket piece 15 which fits over a ball 16 on the upper end of the stem 9. Each spring 12 is tensioned by means of a nut 17 turning on the upper end of a stationary screw 18 rising from the frame 1 and extending through a hole in the spring 12, the nut 17 screwing against the upper face of the spring 12 for regulating the tension thereof. The lens holder stems 9 are arranged at an angle to a direction of movement of its carriage.

Each carriage 3 is also formed with a vertical bracket 19 located near the holder 8, the bracket 19 carrying a device 20 coacting with the block 10 for holding the lens against the grinder. The bracket 19 is held in its adjusted position by a set screw 21.

The means for actuating the carriages includes mechanism whereby one carriage is driven at a different rate of speed from the other, and as here shown, said means comprises a pair of shafts 22, 23 journaled in the frame 1 and extending parallel to the direction of movement of the carriage 2, power transmitting means between the shafts respectively, and the carriages 2, 3, and power transmitting means between the shafts whereby one shaft is driven at a different rate of speed from the other.

The power transmitting means between the shaft 23 and the carriages 3 comprises eccentrics including disks 24 mounted on the shafts, straps 25 around the eccentrics and links 26 rigid with the straps and pivoted at 27 to the inner ends of the carriages 3.

The power transmitting means between the shaft 22 and the carriage 2 includes an eccentric 28, a strap 29, a link 30 which is pivoted at 31 to a vertical movable rack 32 slidable in a suitable guide in the frame, a segment 33 meshing with the rack 32, a rock shaft 34 on which the segment is mounted, the shaft 34 extending crosswise of the shafts 22, 23, and a second segment 35 mounted on the shaft 34 and meshing with a rack 36 on the underside of the carriage 2. The connection between the shafts 22 and 23 whereby the shaft 22 is driven at a different rate of speed from that of the shaft 23 consists of intermeshing gears 37, 38 mounted respectively on the shafts, said gears being of different diameters. The gears 37, 38 are located at one end of the frame and the shaft 34 is located between the ends of the frame.

As will be understood by those skilled in the art, grinders 6 of different curvatures are provided and a particular grinder for producing a required lens is placed on the carriage 2 in any suitable manner, each grinder being here shown as having a socket which fits over a post 39 on the carriage 2 and which is held from turning by a transverse pin 40 in said post, the pin entering open ended slots 41.

In operation, when the grinders have been placed in position on the carriage 2 and the lenses to be ground are placed on the stems 9 and held in position by the part 20 and when the machine is started the carriage 2 will be reciprocated at a less rate of speed than the carriages 3 so that the resultant of the two motions is a series of constantly changing irregular loops, such as illustrated in Fig. 3.

What I claim is:

1. In a lens grinding machine, reciprocating carriages for the grinder and the lens respectively, the carriages being arranged to be moved at an angle to each other, the grinder carriage being formed with a rack, means for actuating the carriages comprising a pair of shafts extending parallel to the direction of movement of the grinder carriage, an eccentric on one shaft connected to the lens carriage, an eccentric on the other shaft, a reciprocating rack connected to the latter eccentric, a shaft extending crosswise of the former shafts and having segments thereon, one segment meshing with the rack of the grinder carriage and the other meshing with the second named rack, and power transmitting means between the shafts whereby one shaft is actuated by the other at a different rate of speed, substantially as and for the purpose described.

2. In a lens grinding machine, a reciprocating lens carriage having a guide at one end fixed thereto and arranged at an angle to the movement of the carriage, a stem slidably mounted in the guide, a device at one end of the stem for engaging the lens, and spring means fixed relatively to the carriage and acting to press on the other end of the stem, the stem and the spring means being connected by a universal joint which permits movement of the stem with the carriage relatively to the spring means, substantially as and for the purpose set forth.

3. In a lens grinding machine, a reciprocating lens carriage, a lens holder at one end of the carriage and provided with a bracket adjustable crosswise of the movement of the carriage, a guide carried by the carriage near the bracket and extending in a direction at an angle to the movement of the carriage, the lens holder including a stem movable in the guide and having a device at one end for engaging the lens, spring means acting on the other end of the stem, means carried by the bracket and coacting with the lens holder for holding the lens against the grinder, a grinder carriage movable in a direction at an angle to the lens carriage, and means for actuating the carriages, substantially as and for the purpose described.

4. A lens grinding machine comprising a reciprocating grinder carriage and a reciprocating lens carriage movable different distances in directions at an angle to each other, and means for operating the carriages at different rates of speed relatively to each other, during their reciprocating movements, said mechanism including shafts, means mounted on the shafts and connected respectively to the carriages, intermeshing gears of different diameters mounted on the shafts, and means for actuating one of the shafts, substantially as and for the purpose set forth.

In testimony whereof, I have hereunto signed my name in the presence of two attesting witnesses, at Syracuse, in the county of Onondaga, and State of New York, this 23rd day of December, 1914.

DAVID COAN.

Witnesses:
S. DAVIS,
T. B. PICKARD.